United States Patent
Sato (10) Patent No.: US 9,446,752 B2
(45) Date of Patent: Sep. 20, 2016

(54) CONTROL APPARATUS FOR ELECTRIC PARKING BRAKE

(71) Applicant: TOYOTA JIDOSHA KABUSHIKI KAISHA, Toyota-shi, Aichi-ken (JP)

(72) Inventor: Taiko Sato, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/487,742

(22) Filed: Sep. 16, 2014

(65) Prior Publication Data

US 2015/0142288 A1    May 21, 2015

(30) Foreign Application Priority Data

Nov. 15, 2013   (JP) ................................. 2013-237388

(51) Int. Cl.
| | |
|---|---|
| *B60T 7/20* | (2006.01) |
| *B60T 7/18* | (2006.01) |
| *B60T 13/74* | (2006.01) |
| *B60T 13/58* | (2006.01) |
| *B60T 13/66* | (2006.01) |
| *B60T 7/12* | (2006.01) |

(52) U.S. Cl.
CPC ............. *B60T 13/741* (2013.01); *B60T 7/122* (2013.01); *B60T 7/18* (2013.01); *B60T 13/586* (2013.01); *B60T 13/662* (2013.01)

(58) Field of Classification Search
CPC .......... B60T 7/22; B60T 13/741; B60T 7/18; B60T 13/586; B60T 13/662
USPC ........................................................ 701/70
See application file for complete search history.

(56) References Cited

U.S. PATENT DOCUMENTS

| | | | |
|---|---|---|---|
| 2006/0163939 A1* | 7/2006 | Kuramochi ............. | B60T 8/885 303/122.04 |
| 2010/0072811 A1* | 3/2010 | Kondo ................... | B60T 13/741 303/20 |
| 2011/0308898 A1* | 12/2011 | Shiraki ................. | B60T 13/741 188/72.4 |
| 2013/0211684 A1 | 8/2013 | Baehrle-Miller et al. | |
| 2015/0066324 A1* | 3/2015 | Baehrle-Miller ..... | B60T 13/662 701/70 |
| 2015/0100215 A1* | 4/2015 | Sussek .................. | B60T 13/662 701/70 |
| 2015/0175137 A1* | 6/2015 | Murata ................... | B60T 7/107 701/70 |

FOREIGN PATENT DOCUMENTS

| | | |
|---|---|---|
| JP | 2009-132332 A | 6/2009 |
| JP | 2009-226964 A | 10/2009 |
| JP | A-2010-76479 | 4/2010 |
| JP | 2010-119257 A | 5/2010 |
| JP | 2013-537863 A | 10/2013 |

* cited by examiner

*Primary Examiner* — Mussa A Shaawat
*Assistant Examiner* — Yazan Soofi
(74) *Attorney, Agent, or Firm* — Oliff PLC (57) ABSTRACT

A control apparatus for an electric parking brake, including an electric motor to generate a brake force by contacted friction materials upon a brake request, includes a no-load current detection unit to detect a current with the no-load electric motor; a voltage monitor unit to detect a voltage applied to the electric motor monitored between two points on a power line; a resistance calculation unit to calculate a resistance between two points based on the no-load current and the monitored voltage; a required voltage calculation unit to calculate a required voltage between the two points required for driving the electric motor to generate the brake force based on the resistance and a target current; and a control unit to flow a current over the target current in the electric motor based on a comparison between the required and monitored voltages.

7 Claims, 4 Drawing Sheets

CONTROL APPARATUS FOR ELECTRIC PARKING BRAKE

FIELD

The disclosures herein generally relate to a control apparatus for an electric parking brake, especially the one having an electric motor that is driven following a parking brake request to generate a brake force for restricting rotation of a wheel by friction between a friction-applying material and a friction-applied material on the wheel where the friction is caused by having the friction-applying material contact the friction-applied material.

BACKGROUND

Conventionally, control apparatuses for electric parking brakes have been known that have electric motors (see, for example, Patent Document 1). In response to receiving a request for a parking brake, such an electric motor is driven to generate a pressure application force for pressing a friction-applying material against a friction-applied material on a wheel. If the electric motor is driven in this way, friction is caused between the friction-applying material and the friction-applied material, which generates a brake force to restrict rotation of the wheel. Also, a control apparatus detects a no-load current, which is a current that flows in the electric motor before having the friction-applying material contact the friction-applied material, and sets a control target current by adding the no-load current with a target current value to be increased for the motor. Then, when the amount of the motor current increased from the no-load current goes over the target current value to be increased for the motor, the drive of the electric motor is stopped.

RELATED-ART DOCUMENTS

Patent Documents

[Patent Document 1] Japanese Laid-open Patent Publication No. 2010-76479

Incidentally, for the electric parking brake system described above to sufficiently exhibit parking performance, it is necessary to apply a required voltage to the electric motor. If there is a shortage of the voltage applied to the electric motor, parking performance is not sufficiently exhibited by the electric motor. Note that even if a positive power terminal and a negative power terminal have the same voltage, there may be a case where a brake force required for parking is not generated by the electric motor depending on the magnitude of a circuit resistance on a power line because the greater the magnitude of the circuit resistance, the smaller the voltage applied to the electric motor becomes.

However, in the control apparatus described in Patent Document 1, the magnitude of the circuit resistance is not taken into consideration on a power line for driving the electric motor; the voltage applied to the electric motor is not detected; and measures are not specified to generate a brake force required for parking if the circuit resistance is great. Therefore, depending on the circuit resistance on the power line, the voltage applied to the electric motor may not reach the required voltage, and a target motor current does not flow in the electric motor, and consequently, a situation may arise where parking performance is not sufficiently exhibited.

In view of the above, it is an object of at least one of the embodiments of the present invention to provide a control apparatus for an electric parking brake that can generate a brake force required for parking by an electric motor even if the circuit resistance on a power line is comparatively great.

SUMMARY

According to at least an embodiment of the present invention, a control apparatus for an electric parking brake, having an electric motor to generate a brake force for restricting rotation of a wheel by friction between a friction-applying material and a friction-applied material on the wheel, the electric motor being driven following a parking brake request, the brake force being generated by making the friction-applying material contact the friction-applied material, includes a no-load current detection unit configured to detect a consumed current in a no-load state where no load is brought on the electric motor after an inrush current has been generated after the electric motor has been started to be driven, until the friction-applying material contacts the friction-applied material; a voltage monitor unit configured to detect a voltage applied to the electric motor between two points on a power line as a monitored voltage; a resistance calculation unit configured to calculate a circuit resistance between the two points based on the consumed current in the no-load state detected by the no-load current detection unit and the monitored voltage detected by the voltage monitor unit; a required voltage calculation unit configured to calculate a required voltage between the two points required for driving the electric motor to generate the brake force based on the circuit resistance calculated by the resistance calculation unit and a control target current; and a control unit configured to execute a process for flowing a current greater than or equal to the control target current in the electric motor based on a comparison result between the required voltage calculated by the required voltage calculation unit and the monitored voltage detected by the voltage monitor unit.

According to at least one of the embodiments of the present invention, it is possible to generate a brake force required for parking by an electric motor even if the circuit resistance on a power line is comparatively great.

DESCRIPTION OF EMBODIMENTS

In the following, embodiments of the present invention will be described with reference to the drawings.

Figure 1:
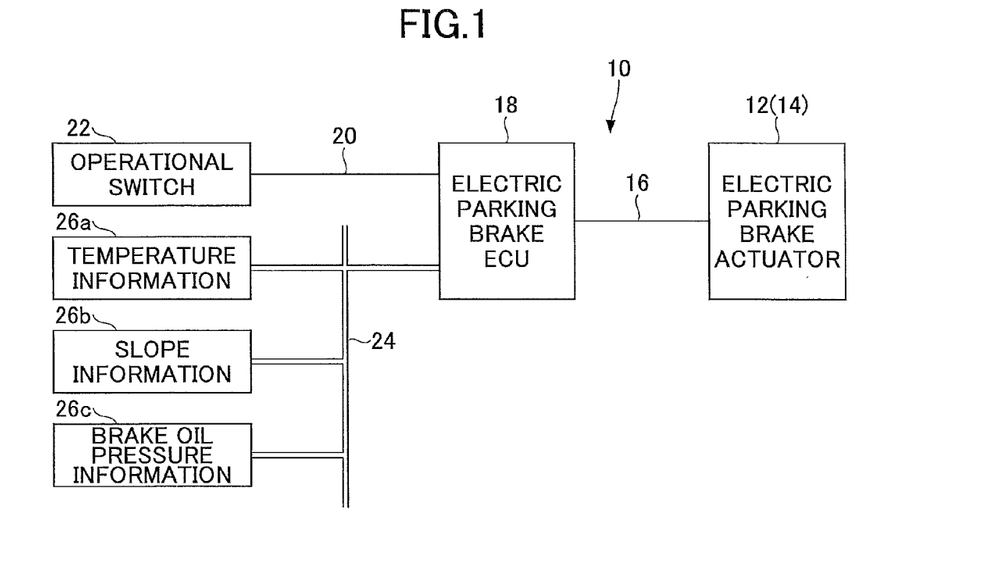
FIG. 1 is a configuration diagram of a control apparatus for an electric parking brake according to an embodiment of the present invention.
Figure 2:
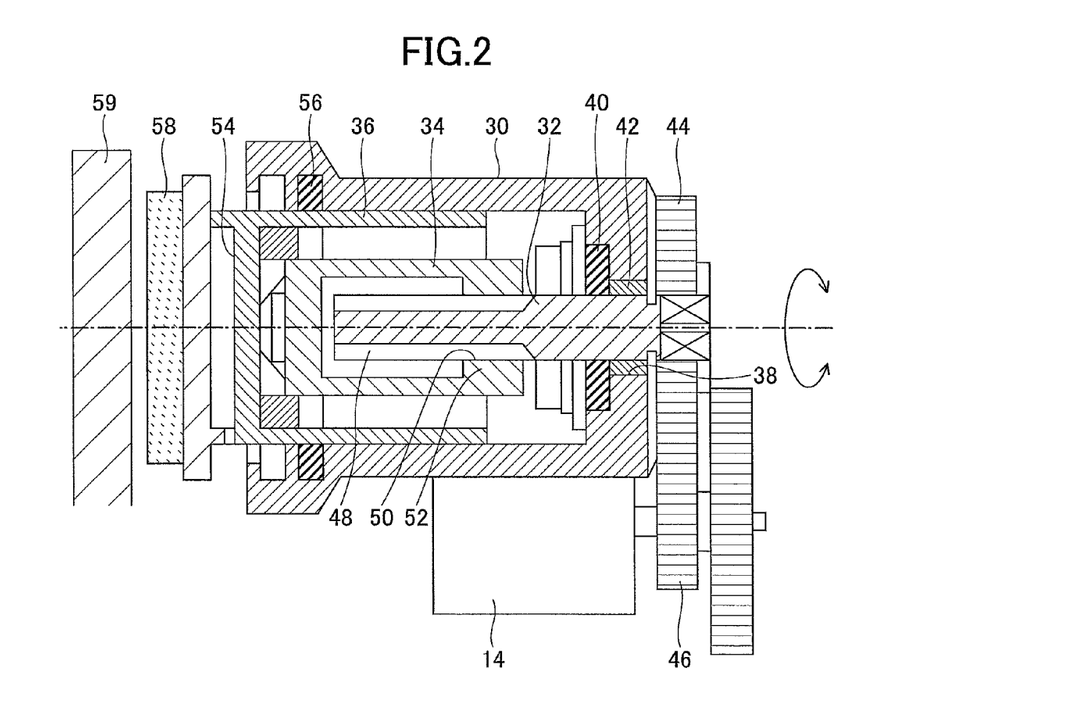
FIG. 2 is a cross-sectional view of an electric parking brake system according- to the present embodiment.

FIG. 1 illustrates a configuration diagram of a control apparatus 10 for an electric parking brake according to an embodiment of the present invention. Also, FIG. 2 illustrates a cross-sectional view of an electric parking brake system 12 according to the present embodiment.

The electric parking brake system in the present embodiment (simply referred to as the "system" below) 12 is built in a vehicle, and is an actuator to restrict rotation of wheels of the vehicle when parking the vehicle. The system 12 includes an electric motor 14. The system 12 generates a brake force to restrict rotation of the wheels by driving the electric motor 14 to rotate to a predetermined position. Note that, in the present embodiment, the system 12 is the actuator that is partially shared with a service brake system to generate a brake force for restricting rotation of the wheels by a pedaling force depending on a pedaling operation of a brake pedal by a vehicle driver.

The control apparatus for the electric parking brake (simply referred to as the "control apparatus" below) 10 includes an electronic control unit (referred to as an "electric parking brake ECU" below) 18 that is connected with the electric motor via a wire 16, directly by the wire. The electric parking brake ECU 18 is configured with a microcomputer as a main component, and controls the drive of the electric motor 14 following a program stored beforehand in a ROM. The electric motor 14 is driven to rotate when being applied with a voltage following a drive command from the electric parking brake ECU 18.

The electric parking brake ECU 18 is connected with an operational switch 22 via a wire 20, which is a direct line. The operational switch is a switch operated by a vehicle driver for parking the vehicle, and outputs an on-operation signal to the electric parking brake ECU 18 via the wire 20 when an on-operation is executed. The electric parking brake ECU 18 determines whether a parking brake is requested by the vehicle driver based on the signal from the operational switch 22 via the wire 20.

The electric parking brake ECU 18 is also connected with various ECU sensors (referred to as "the other ECU elements") 26 via a communication bus 24 such as a CAN. The other ECU elements 26 include a sensor to output information about a current temperature generated in the vehicle (26a) (for example, the temperature of the electric motor 14), a sensor to output information about a current slope of the vehicle in the back and forth direction (26b), and a sensor to output information about oil pressure currently generated in a brake oil pressure system of the vehicle (26c). Based on signals from the other ECU elements 26 via the communication bus 24, the electric parking brake ECU 18 obtains the information indicating various states currently generated for the vehicle; then, based on the obtained information, calculates a brake force to be generated by the electric motor 14 and a control target current to be circulated in the electric motor 14 for generating the brake force; and controls the drive of the electric motor 14 so that the brake force is generated.

The system 12 includes a body 30 that constitutes a wheel cylinder. The body 30 is formed in a cylindrical shape with a hollow, and is configured so that brake hydraulic pressure can be introduced in the hollow. In the hollow in the body 30, a rotational shaft 32, a propeller shaft 34, and a piston 36 are contained.

The rotational shaft 32 is an extended rod-shaped member. One end of the rotational shaft is inserted into and pivotally supported by an insertion hole 38 formed on one end surface of the body 30. At the insertion hole 38, a shaft bearing 40 is disposed to support the rotational shaft 32, and a seal member 42 such as an O-ring is also disposed to prevent the brake hydraulic pressure in the hollow in the body 30 from leaking to the outside through the insertion hole 38. The rotational shaft 32 is inserted into the insertion hole 38, and supported by the shaft bearing 40 to rotate.

A spur gear 44 is connected at the one end of the rotational shaft 32. The spur gear 44 is engaged with a spur gear 46. The spur gears 44 and 46 rotate at a predetermined rotation ratio to each other. The spur gear 46 is connected with an output shaft of the electric motor 14. The spur gear 46 rotates when the electric motor 14 is driven to rotate. The above rotational shaft 32 rotates when the spur gears 44 and 46 rotate when the electric motor 14 is driven to rotate. Also, on the outer surface of the other end of the rotational shaft 32, male screw grooves 48 are formed.

The propeller shaft 34 is a member formed in a cylindrical shape having a hollow in it. It is formed in the cylindrical or polygonal-pillar shape so that it is configured not to rotate around the rotational center of the rotational shaft 32 even if the rotational shaft 32 rotates. At an end surface of the propeller shaft 34, an insertion hole 50 is formed. On the internal surface of the insertion hole 50, female screw grooves 52 are formed. The rotational shaft 32 is inserted into the insertion hole 50, and the male screw grooves 48 of the rotational shaft 32 are screwed together with the female screw grooves 52 of the body 30. The other end of the rotational shaft 32 may be projected into the hollow in the propeller shaft 34.

The rotational shaft 32 and the propeller shaft 34 are relatively displaced to each other in the shaft direction when the rotational shaft 32 rotates by the engagement of the male screw grooves 48 and the female screw grooves 52. Namely, when the rotational shaft 32 rotates by the rotational drive of the electric motor 14, the engagement of the male screw grooves 48 and the female screw grooves 52 prevents the propeller shaft 34 from rotating, and the rotational force of the rotational shaft 32 is converted into a force that displaces the propeller shaft 34 in the shaft direction, which makes the propeller shaft 34 displaced in the shaft direction. Also, when the rotational drive of the electric motor 14 is stopped, the rotation of the rotational shaft 32 is stopped, the displacement of the propeller shaft 34 in the shaft direction is stopped, and the propeller shaft 34 is held at the stopped position by a friction force generated by the engagement of the male screw grooves 48 and the female screw grooves 52.

The piston 36 is a member formed in a cylindrical or polygonal-pillar shape, and is configured to enclose the circumference of the propeller shaft 34. In the cylinder of the piston 36, the propeller shaft 34 is inserted where the propeller shaft 34 can be displaced in the shaft direction. At one end (the left end in FIG. 2) of the piston 36, a bottom part 54 is provided to close the cylindrical part of the inner circumference. The bottom part 54 is a part that can come into contact with the one end (the left end in FIG. 2) of the propeller shaft 34. Also, the piston 36 is formed so that its outer wall surface contacts the inner wall surface of the body 30. In the inner wall of the body 30, a seal member 56 is disposed to prevent the brake hydraulic pressure in the hollow in the body 30 from leaking to the outside through the space between the outer wall surface of the piston 36 and the inner wall surface of the body 30.

The piston 36 can be displaced toward the one end in the shaft direction relative to the body 30 (leftward in FIG. 2) when its bottom part 54 is pressed toward the one end of the propeller shaft 34 by the displacement of the propeller shaft 34 in the shaft direction. Also, the piston 36 can be displaced toward the one end in the shaft direction relative to the body 30 (leftward in FIG. 2), independently from the propeller shaft 34, when the brake hydraulic pressure is introduced in the hollow in the body 30. Namely, the piston 36 can be displaced toward the one end in the shaft direction relative to the body 30 (leftward in FIG. 2) by both the pressure by the propeller shaft 34 and the brake hydraulic pressure.

If the brake hydraulic pressure is not introduced in the hollow in the body 30 in a state where the propeller shaft 34 is at an initial position before the electric motor 14 is driven to rotate, the piston 36 is displaced and held at the other end in the shaft direction in the hollow (rightward in FIG. 2) by an elastic force of a return spring (not shown) or negative pressure in the hollow. Also, even if the brake hydraulic pressure in the hollow in the body 30 becomes smaller after the propeller shaft 34 has been displaced toward the one end in the shaft direction from the initial position while the electric motor 14 is driven to rotate, the displaced propeller shaft 34 restricts the displacement of the piston 36 toward the other end in the shaft direction.

A brake pad 58 is attached and disposed at the one end of the piston 36. The brake pad 58 is a member to be contacted with an end surface of a brake disk 59 facing in the shaft direction where the brake disk 59 is fixed' on a wheel and rotates together with the wheel. The brake disk 59 is applied with braking by two brake pads 58 that sandwich the brake disk 59 from both sides in the shaft direction. The brake pad 58 is moved in the shaft direction (the left or right direction in FIG. 2) along with the displacement of the piston 36 in the shaft direction, and the movement is stopped and held when the displacement of the piston 36 is stopped.

When an on-operation is made with the operational switch 22 in the system 12, the electric parking brake ECU 18 receives it as a request for the parking brake, and executes a lock control to generate a brake force. Specifically, it calculates the brake force to be generated by the electric motor 14 based on a vehicle state, and issues a drive command to the electric motor 14. When the electric motor 14 is driven to rotate in one direction (positive direction) following the drive command from the electric parking brake ECU 18, the spur gear 44 and the rotational shaft 32 rotates in the positive direction along with the rotation of the spur gear 46. When the rotational shaft 32 rotates in the positive direction, the engagement of the male screw grooves 48 and the female screw grooves 52 displaces the propeller shaft 34 toward the one end in the shaft direction.

The displacement of the propeller shaft 34 toward the one end in the shaft direction makes the propeller shaft 34 come into contact with the bottom part 54 of the piston 36, and then, when the propeller shaft 34 is further displaced toward the one end in the shaft direction, the propeller shaft 34 presses the bottom part 54 of the piston 36, and the piston 36 is moved toward the one end in the shaft direction. Then, the displacement continues toward the one end in the shaft direction of the propeller shaft 34 until the brake pad 58 at the end of the piston 36 contacts the brake disk 59, and then, the brake pad 58 contacts the brake disk 59 to generate the brake force.

When the brake pad 58 contacts the brake disk 59 to generate the brake force, the load brought on the electric motor 14 increases, and hence, the consumed current increases. After having started the lock control, the electric parking brake ECU 18 detects a current I that flows on the power line between a positive power terminal (power terminal) and a negative power terminal (ground terminal) where the terminals are provided for applying a voltage to the electric motor 14, and determines whether the detected current I reaches a control target current set from a vehicle state. Then, when the current I reaches the control target current, it is recognized that a desired brake force is generated by the electric motor 14, and the lock control is completed by stopping the application of voltage to the electric motor 14 and stopping the rotational drive of the electric motor 14. Note that even if the lock control is completed by stopping the rotational drive of the electric motor 14, the propeller shaft 34 is held at the stopped position to maintain the brake force.

Also, when an off-operation is made with the operational switch 22, the electric parking brake ECU 18 receives it as a release of the request for the parking brake, and executes release control for releasing the generation of the brake force. Specifically, it issues a drive release command to the electric motor 14. When the electric motor 14 is driven to rotate in the other direction (reverse direction) following the drive release command from the electric parking brake ECU 18, the spur gear 44 and the rotational shaft 32 rotate in the reverse direction along with the rotation of the spur gear 46. When the rotational shaft 32 rotates in the reverse direction, the engagement of the male screw grooves 48 and the female screw grooves 52 displaces the propeller shaft 34 toward the other end in the shaft direction.

When the propeller shaft 34 is displaced toward the other end in the shaft direction from the state where the brake pad 58 contacts the brake disk 59, the piston 36 is allowed to be displaced toward the other end in the shaft direction, which releases the contact between the brake pad 58 and the brake disk 59, and thus, the generation of the brake force is released. Note that the displacement of the propeller shaft 34 toward the other end in the shaft direction, namely, the rotational drive of the electric motor 14 in the reverse direction is executed until a predetermined clearance is secured between the one end of the propeller shaft 34 and the bottom part 54 of the piston 36. Then, when the clearance is secured, the electric parking brake ECU 18 stops the application of voltage to the electric motor 14 to stop the reverse rotational drive of the electric motor 14, and completes the release control.

Also, when a pedaling operation is performed on the brake pedal in the system 12, the brake hydraulic pressure is introduced in the hollow in the body 30 by a pedaling force depending on the pedaling operation. When the brake hydraulic pressure is introduced in the hollow in the body 30, the brake hydraulic pressure moves the piston 36 toward the one end in the shaft direction to make the brake pad 58 contact the brake disk 59 to generate the brake force.

Incidentally, in the system 12 in the present embodiment, when the electric parking brake ECU 18 determines that a parking brake request is made with the operational switch 22, it calculates the brake force to be generated by the electric motor 14 depending on a vehicle state, and controls to drive the electric motor 14 to generate the calculated brake force. Specifically, it applies a predetermined voltage to the electric motor 14 to flow the current in the electric motor 14 for driving the electric motor 14 to rotate.

If the control target current circulates in the electric motor 14 by applying a required voltage to the electric motor 14, the electric motor 14 can be driven to rotate as requested, and the system 12 can sufficiently exhibit the parking performance of the vehicle. On the other hand, if the voltage applied to the electric motor 14 does not reach the required voltage, the current circulating in the electric motor 14 does not reach the control target current, and the electric motor 14 is not driven to rotate as requested, which may result in a situation where the system 12 cannot sufficiently exhibit the parking performance of the vehicle.

Specifically, the circuit resistance may fluctuate on the power line between the power terminal and the ground terminal for applying voltage to the electric motor 14. In this regard, in a state where the voltage is the same between the power terminal and the ground terminal, the greater the circuit resistance is, the lower the voltage becomes that is actually applied between both ends of the main body of the electric motor 14. Therefore, depending on the magnitude of the circuit resistance, there may be cases where a required brake force cannot be generated for parking by the electric motor with normal control.

Thereupon, in the system 12 in the present embodiment, by making a control target current appropriately flow in the electric motor 14 even if the circuit resistance on the power line is comparatively great, the required brake force can be generated by the electric motor 14 for vehicle parking. In the following, characteristic parts in the present embodiment will be described with reference to FIGS. 3-5.

Figure 3:
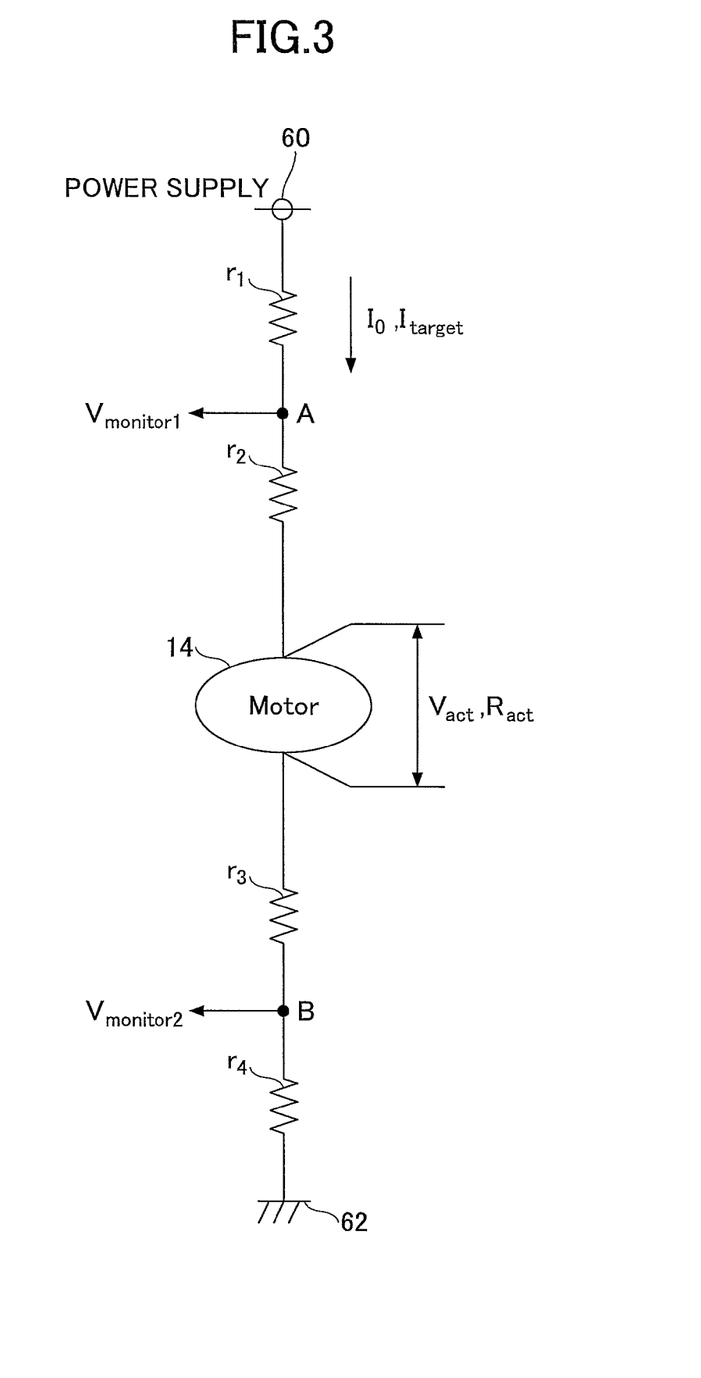
FIG. 3 is a circuit configuration diagram of the electric parking brake system according to the present embodiment.
Figure 4:
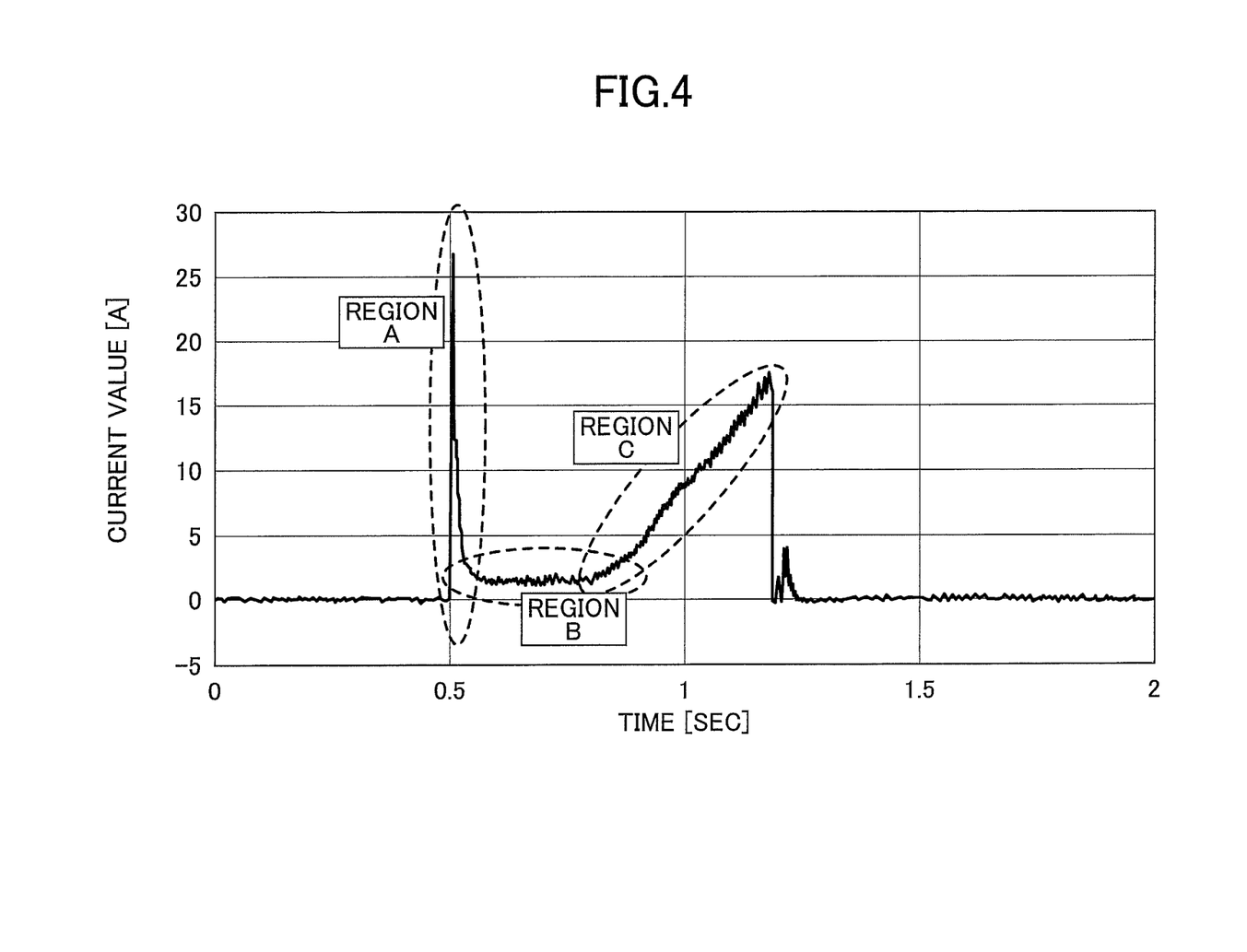
FIG. 4 is a general view of a consumed current waveform when driving an electric motor in the electric parking brake system according to the present embodiment.
Figure 5:
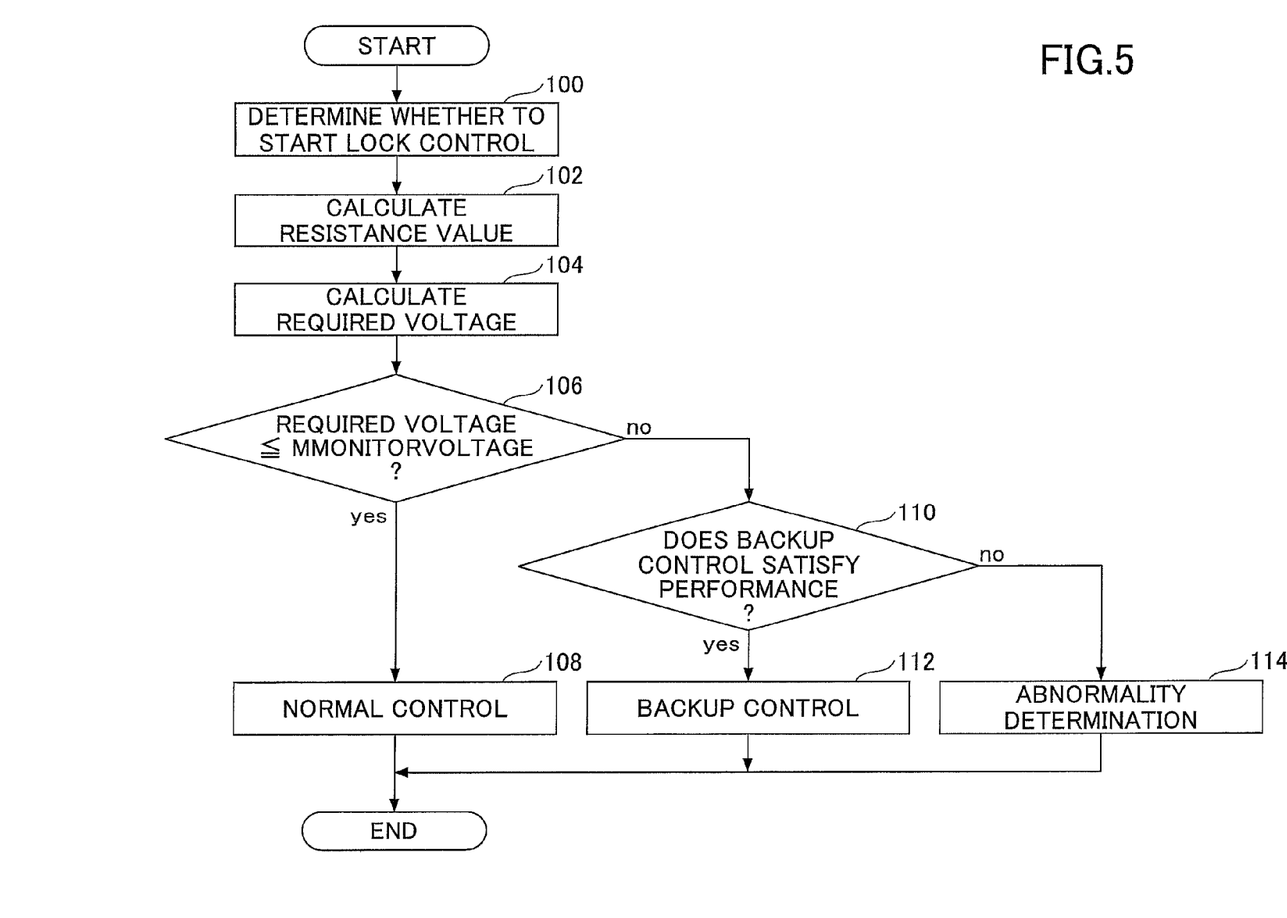
FIG. 5 is a flowchart of an example of a control routine executed in the electric parking brake system according to the present embodiment.

FIG. 3 illustrates a circuit configuration diagram of the electric parking brake system 12 according to the present embodiment. FIG. 4 illustrates a general view of a consumed current waveform when driving the electric motor 14 in the electric parking brake system 12 according to the present embodiment. And FIG. 5 illustrates a flowchart of an example of a control routine executed by the electric parking brake system 18 according to the present embodiment.

In the present embodiment, when the electric parking brake ECU 18 determines that a parking brake request is made with the operational switch 22, it applies voltage to the electric motor 14, and then, monitors the voltages $V_{monitor1}$ and $V_{monitor2}$ generated at two points on the power line between the power terminal 60 and the ground terminal 62 for applying voltage to the electric motor 14, which is taken as the voltage applied to the electric motor 14, and detects the current I flowing on the power line as the circulation current. Note that the detection of the circulation current may be assumed to be executed, for example, based on the voltage between both terminals of a shunt resistance (not shown), which is provided on the power line between the power terminal 60 and the ground terminal 62 (for example, between the resistance $r_3$ and the input terminal B described below), and has a known resistance value.

In the above configuration where the voltage on the power line between the power terminal and the ground terminal 62 is monitored at two points as $V_{monitor1}$ and $V_{monitor2}$, as illustrated in FIG. 3, resistances are generated at the following points: a resistance $r_1$ between the power terminal 60 and the input terminal (specifically, the terminal at which the voltage $V_{monitor1}$ is monitored) A of the electric parking brake ECU 18; a resistance $r_2$ between the input terminal A and the electric motor 14; a resistance $r_3$ between the electric motor 14 and the input terminal (specifically, the terminal at which the voltage $V_{monitor2}$ is monitored) B of the electric parking brake ECU 18; and a resistance $r_4$ between the input terminal B and the ground terminal 62. If the resistance values of the resistances $r_1$ to $r_4$ are greater than expected, the voltage applied to both terminals of the main body of the electric motor 14 does not reach an expected value, and there is a risk that the required brake force is not generated for vehicle parking.

In contrast to the above, in the present embodiment, after a parking brake request has been made with the operational switch 22, and the application of voltage to the electric motor 14 has been started, the electric parking brake ECU 18 executes the following steps: (1) calculate magnitudes of the resistances $r_1$ to $r_4$ (especially, the resistances $r_2$ and $r_3$) on the power line; (2) based on the magnitudes of the resistances $r_2$ and $r_3$ and a control target current $I_{target}$ to generate a required brake force for vehicle parking, calculate the required voltage $V_{need}$ for a rotational drive of the electric motor 14 to generate the required brake force for the vehicle parking; (3) compare the required voltage $V_{need}$ with the voltage difference between the monitored voltages $V_{monitor1}$ and $V_{monitor2}$ ($V_{monitor1}-V_{monitor2}$); and (4) based on the comparison result, control the drive of the electric motor 14.

The resistances $r_2$ and $r_3$ on the power line can be calculated based on a current on the power line (consumed current) $I_0$ that flows in a no-load state where no load is brought on the electric motor 14, and the voltage difference between the monitored voltages ($V_{monitor1}-V_{monitor2}$).

Soon after the application of voltage has been started on the electric motor 14 to start the rotational drive of the electric motor 14, an inrush current having a great current value circulates in the electric motor 14 as a pulse (region A encircled with a dashed line in FIG. 4). After the inrush current has been generated, and until the brake pad 58 comes into contact with the brake disk 59 by the rotational drive of the electric motor 14 (especially, from a state in which the predetermined clearance is secured between the one end of the propeller shaft 34 and the bottom part 54 of the piston 36), until the one end of the propeller shaft 34 comes into contact with the bottom part 54 of the piston 36), the no-load state is formed where virtually no load is brought on the electric motor 14, and hence, the consumed current on the power line is held at a nearly-fixed value greater than or equal to zero for a certain length of time (region B encircled with a dashed line in FIG. 4). In this regard, if the consumed current (no-load current) $I_0$ in the no-load state can be detected based on the voltage between both terminals of the shunt resistance, the magnitudes of the resistances $r_2$ and $r_3$ can be calculated.

Then, leaving from the state in which the predetermined clearance is secured between the one end of the propeller shaft 34 and the bottom part 54 of the piston 36, the brake pad 58 comes into contact with the brake disk 59 (especially the one end of the propeller shaft 34 comes into contact with the bottom part 54 of the piston 36), and then, the load brought on the electric motor 14 gradually increases, which makes the consumed current on the power line increase proportionate to the magnitude of the load (region C encircled with a dashed line in FIG. 4).

The electric parking brake ECU 18 determines whether a request for a parking brake is made based on the signal from the operational switch 22, and if it determines that the request for a parking brake has been made, it starts the application of voltage to the electric motor 14 to start the lock control (Step 100).

After having started the lock control, the electric parking brake ECU 18 detects the current I on the power line based on the voltage between both terminals of the shunt resistance to measure a waveform of the detected current I, and based on the current waveform, detects the no-load current $I_0$ that takes the nearly-fixed value after the inrush current has been generated. When detecting the no-load current $I_0$, the electric parking brake ECU 18 also monitors the voltages $V_{monitor1}$ and $V_{monitor2}$ on the power line to calculate the voltage difference ($V_{monitor1}-V_{monitor2}$) of these voltages. Then, based on the no-load current $I_0$ and the voltage difference ($V_{monitor1}-V_{monitor2}$), as in the following formula (1), it calculates the resistance ($r_2+r_3$) between the two points where the voltages $V_{monitor1}$ and $V_{monitor2}$ are monitored on the power line between the power terminal 60 and the ground terminal 62 (Step 102).

$$(r_2+r_3)=(V_{monitor1}-V_{monitor2})/I_0 \qquad (1)$$

Next, based on the calculated resistance ($r_2+r_3$), the control target current $I_{target}$ to generate a required brake force for vehicle parking, and a known inside resistance $R_{act}$ of the electric motor 14, the electric parking brake ECU 18 calculates the required voltage $V_{need}$ between the two points on the power line that is required for the rotational drive of the electric motor 14 to generate the required brake force for the vehicle parking in the following formula (2) (Step 104).

$$V_{need} = I_{target} \times (R_2 + R_3 + R_{act}) \qquad (2)$$

Then, the electric parking brake ECU 18 compares the calculated required voltage $V_{need}$ with the voltage difference between the voltages $V_{monitor1}$ and $V_{monitor2}$ monitored on the power line (Step 106). As a result of the comparison, if $V_{need} \le (V_{monitor1} - V_{monitor2})$ is satisfied, namely, if $V_{monitor1} \ge V_{monitor2} - I_{target} \times I_0 \times R_{act}/(I_{target} - I_0)$ is satisfied, the current application of voltage to the electric motor 14 can be kept unchanged to flow a current greater than or equal to the control target current for generating the required brake force for normal vehicle parking, and hence, the drive control is normally executed for the electric motor 14 (Step 108).

On the other hand, if $V_{need} > (V_{monitor1} - V_{monitor2})$ is satisfied, namely, if $V_{monitor1} < V_{monitor2} - I_{target} \times I_0 \times R_{act}/(I_{target} - I_0)$ is satisfied, keeping the current application of voltage cannot make the current greater than or equal to the control target current flow in the electric motor 14. Therefore, it determines at the next step whether predetermined backup control of the application of voltage to the electric motor 14 can make the current greater than or equal to the control target current flow to secure performance for generating the required brake force for the normal vehicle parking (Step 110).

Note that the backup control is to increase the current in the electric motor 14 by making the voltage applied to the electric motor 14 higher than that for the normal control, which is achieved, for example, by making the power supply voltage greater between the power terminal 60 and the ground terminal 62, or if electric motors 14 are provided for the left and right wheels, respectively, and there is a shared part such as a harness for those electric motors, by making the electric motors 14 operate one by one (for example, duty control using the reverse phase) without operating both electric motors 14 at the same time.

If the electric parking brake ECU 18 determines at Step 110 that the performance can be satisfied with the backup control, then, it executes the backup control (Step 112). When the backup control is executed, the current greater than or equal to the control target current flows in the electric motor 14 to generate the required brake force for the normal vehicle parking. On the other hand, if the electric parking brake ECU 18 determines that the performance cannot be satisfied with the backup control, then, it determines that a fault is generated in the system 12, and thus, the abnormality is confirmed (also referred to as "abnormality determination" below) (Step 114). When the abnormality is confirmed, a diagnostic memory is activated for storing information about the system abnormality, a visual alarm and an audible alarm are output for a vehicle driver, and a process is executed to prompt the vehicle driver to take necessary measures for vehicle parking, which are different from the on-operation of the operational switch 22.

By the process of the above routine, if the voltage difference ($V_{monitor1} - V_{monitor2}$) between the monitored voltages $V_{monitor1}$ and $V_{monitor2}$ is greater than or equal to the required voltage $V_{need}$, the current greater than or equal to the control target current can flow in the electric motor 14 by the application of voltage as usual.

On the other hand, if the voltage difference ($V_{monitor1} - V_{monitor2}$) between the monitored voltages $V_{monitor1}$ and $V_{monitor2}$ is less than the required voltage $V_{need}$, and the performance is secured to generate the required brake force for the normal vehicle parking with the current flow greater than or equal to the control target current by the backup control, by executing the backup control instead of the normal control, the current greater than or equal to the control target current can flow in the electric motor 14.

Also, if the voltage difference ($V_{monitor1} - V_{monitor2}$) between the monitored voltages $V_{monitor1}$ and $V_{monitor2}$ is less than the required voltage $V_{need}$, and the performance is not secured by the backup control, it is determines that a fault occurs in the system 12, and diagnostic information about the abnormality can be registered.

As above, according to the present embodiment, even if the circuit resistance is great between the power terminal 60 and the ground terminal 62 on the power line, and a current greater than or equal to the control target current cannot flow in the electric motor 14 to generate the required brake force for vehicle parking due to a shortage of the application voltage by the normal control, it is possible to make the current greater than or equal to the control target current flow in the electric motor 14 to generate the required brake force for the vehicle parking by executing the backup control. In this regard, the shortage of the application voltage on the electric motor 14 under the normal control caused by a voltage drop due to a temperature characteristic or the like can be distinguished from diagnostic abnormality due to a component fault. Therefore, even if a shortage of the application voltage occurs, the parking performance can be sufficiently exhibited by executing the backup control, diagnostic abnormality can be prevented from being unnecessarily determined, and the occurrence frequency of diagnostics can be reduced.

Also, in the present embodiment, when calculating the circuit resistance on the power line between the power terminal 60 and the ground terminal 62, the consumed current $I_0$ and the monitored voltages $V_{monitor1}$ and $V_{monitor2}$ are used where the consumed current $I_0$ is obtained in a no-load state where the current value is stable after an inrush current has been generated until the brake pad 58 comes into contact with the brake disk 59 by the rotational drive of the electric motor 14 (especially, until the one end of the propeller shaft 34 comes into contact with the bottom part 54 of the piston 36). Also, the detection of the consumed current $I_0$ in the no-load state is executed by using the shunt resistance used for current detection in the lock control. Therefore, according to the present embodiment, the circuit resistance on the power line can be calculated accurately, in real time, without adding components or changing the circuit.

In this regard, based on the circuit resistance on the power line, the required voltage $V_{need}$ can be calculated between the two points on the power line that is required for the rotational drive of the electric motor 14 to generate the required brake force for vehicle parking, and it can be determined whether the voltage applied between the two points on the power line when controlling the drive of the electric motor 14 is greater than or equal to the required voltage $V_{need}$. Therefore, the backup control can be appropriately executed, and when the performance is satisfied by the backup control, the parking performance can be sufficiently exhibited.

Note that, in the above embodiment, the brake pad 58 corresponds to a "friction-applying material" described in the claims, and the brake disk 59 corresponds to a "friction-applied material" described in the claims, respectively. Also, the electric parking brake ECU 18 implements the following units in the claims: a "no-load current detection unit" described in the claims, by detecting the consumed current I in a no-load state where virtually no load is brought on the electric motor 14; a "voltage monitor unit" described in the claims, by monitoring the voltages $V_{monitor1}$ and $V_{monitor2}$; a "resistance calculation unit" described in the claims, by calculating the resistance ($R_2+R_3$) between the two points on the power line between the power terminal 60 and the ground terminal 62 at Step 102; a "required voltage calculation unit" described in the claims, by calculating the required voltage $V_{need}$ for the rotational drive of the electric motor 14 to generate the required brake force for vehicle parking at Step 104; and a "control unit" described in the claims, by executing drive control of the electric motor 14 at Steps 108 and 112.

Also, in the above embodiment, the electric parking brake ECU 18 also implements the following units in the claims: a "performance satisfiability determination unit" described in the claims, by determining whether the performance is satisfied to generate the required brake force for the normal vehicle parking with the current greater than or equal to the control target current flow by the backup control at Step 110; and an "abnormality determination unit" described in the claims, by executing abnormality determination upon a fault is generated in the system 12 at Step 114.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

The present application is based on Japanese Priority Application No. 2013-237388, filed on Nov. 15, 2013, the entire contents of which are hereby incorporated by reference.

What is claimed is:

1. A control apparatus for an electric parking brake, including an electric motor to generate a brake force for restricting rotation of a wheel by friction between a friction-applying material and a friction-applied material on the wheel, the electric motor being driven following a parking brake request, the brake force being generated by making the friction-applying material contact the friction-applied material, comprising:
   a no-load current detection unit configured to detect a consumed current in a no-load state where no load is brought on the electric motor after an inrush current has been generated after the electric motor has been started to be driven, until the friction-applying material contacts the friction-applied material;
   a voltage monitor unit configured to detect a voltage applied to the electric motor between two points on a power line as a monitored voltage;
   a resistance calculation unit configured to calculate a circuit resistance between the two points based on the consumed current in the no-load state detected by the no-load current detection unit and the monitored voltage detected by the voltage monitor unit;
   a required voltage calculation unit configured to calculate a required voltage between the two points required for driving the electric motor to generate the brake force based on the circuit resistance calculated by the resistance calculation unit and a control target current; and
   a control unit configured to execute a process for flowing a current greater than or equal to the control target current in the electric motor based on a comparison result between the required voltage calculated by the required voltage calculation unit and the monitored voltage detected by the voltage monitor unit.

2. The control apparatus for the electric parking brake as claimed in claim 1, wherein the control unit executes normal control to flow the current into the electric motor by a normal method when the monitored voltage detected by the voltage monitor unit is greater than or equal to the required voltage calculated by the required voltage calculation unit, whereas the control unit executes backup control to flow the current to the electric motor greater than the current flowed in the electric motor by the normal control when the monitored voltage detected by the voltage monitor unit is less than the required voltage calculated by the required voltage calculation unit.

3. The control apparatus for the electric parking brake as claimed in claim 2, further comprising:
   a performance satisfiability determination unit configured to determine whether the current to be flowed in the electric motor by the backup control is greater than or equal to the control target current if the monitored voltage detected by the voltage monitor unit is less than the required voltage calculated by the required voltage calculation unit,
   wherein the control unit executes the backup control when the performance satisfiability determination unit determines the current to be flowed in the electric motor by the backup control being greater than or equal to the control target current.

4. The control apparatus for the electric parking brake as claimed in claim 3, further comprising:
   an abnormality determination unit configured to determine abnormality occurring in an electric parking brake system when the performance satisfiability determination unit determines the current to be flowed in the electric motor by the backup control being greater than or equal to the control target current.

5. The control apparatus for the electric parking brake as claimed in claim 2, wherein the backup control is to make the voltage applied for driving the electric motor increase so that the voltage between the two points becomes greater than or equal to the required voltage.

6. The control apparatus for the electric parking brake as claimed in claim 3, wherein the backup control is to make the voltage applied for driving the electric motor increase so that the voltage between the two points becomes greater than or equal to the required voltage.

7. The control apparatus for the electric parking brake as claimed in claim 4, wherein the backup control is to make the voltage applied for driving the electric motor increase so that the voltage between the two points becomes greater than or equal to the required voltage.

* * * * *